March 26, 1963 R. J. GAUBERT 3,083,269

PROGRAMMED TAPE APPARATUS

Filed April 14, 1961 4 Sheets-Sheet 1

INVENTOR.
RENE J. GAUBERT
BY
Flehr and Swain
ATTORNEYS

INVENTOR.
RENE J. GAUBERT
BY
Flehr and Swain
ATTORNEYS

March 26, 1963 R. J. GAUBERT 3,083,269

PROGRAMMED TAPE APPARATUS

Filed April 14, 1961 4 Sheets-Sheet 3

INVENTOR.
RENE J. GAUBERT

BY

Flehr and Swain
ATTORNEYS

*INVENTOR.*
RENE J. GAUBERT
*BY*
Flehr and Swain
ATTORNEYS

United States Patent Office 3,083,269

Patented Mar. 26, 1963

3,083,269

PROGRAMMED TAPE APPARATUS

Rene J. Gaubert, 4206 Oakmore Road, Oakland, Calif.

Filed Apr. 14, 1961, Ser. No. 103,093
20 Claims. (Cl. 179—100.2)

This invention relates generally to a programmed tape apparatus and more particularly to an apparatus for programming and recording and/or reproducing of individual records on a plurality of recording tapes.

In Patent No. 2,821,576, there is described a programmed magnetic tape apparatus which received a plurality of tape magazines, each carrying a magnetic tape with at least one recording thereon. A transducer is adapted to reproduce the recorded tape in selected magazines. Means are provided for driving the tape past the transducer. Means are provided for shifting the transducer into cooperative relationship with a selected magazine. The selected magazine is moved to engage the tape driving means and the transducer to reproduce the recording carried by the tape of the selected magazine.

In my copending application Serial No. 626,071, now Patent No. 3,001,025, filed November 28, 1956, entitled, "Magnetic Tape Apparatus," there is described an apparatus in which a transducer and tape drive means are brought into cooperative relationship with a selected tape to reproduce recordings thereon. The magazines are releasably held in the apparatus by a latching mechanism which also serves to urge the magazine into yieldable cooperative relationship with the tape drive means and transducer.

In the apparatus of my patent and pending application, the program may be preselected and varied as desired by an operator. In certain applications, for example, in supplying background music, such flexibility of selection is not necessary. It is sufficient to provide a fixed program and select the magazines to achieve the desired order of recording or reproduction. For example, it may be desirable to provide a first recording of instructions, announcements and the like, and a plurality of second recordings which carry music, information, further instructions and the like. The apparatus is then programmed so that it goes from the first recording to the second recordings to reproduce a selection thereon and then back to the first for further instructions, etc.

Typical applications of apparatus of the foregoing type may be for use in providing background music in grocery stores, department stores, factories, and the like. Spot announcements may be pre-recorded on a first recording, while background music may be provided on a plurality of other recordings. The apparatus then serves to play the recording from one of the second recordings and then transfer back to the first recording for an announcement, at which time it then proceeds to play a second recording, etc.

Apparatus of the foregoing character might also be used in an automatic radio station wherein spot announcements may be pre-recorded on a first recording with a plurality of second recordings carried in magazines being selectively placed in the apparatus to provide the desired program.

Another use of apparatus of the foregoing character might be in a language teaching system. In such a system, instructions and the like may be placed on the first recording, while the actual teaching material may be placed on the plurality of second recordings.

It is desirable to provide a programmed apparatus which is simple in construction, inexpensive, and which can be easily operated.

It is a general object of the present invention to provide an improved programmed tape apparatus.

It is another object of the present invention to provide a programmed tape apparatus which is of simplified construction, inexpensive, and which is easy to operate.

Briefly, the apparatus of the present invention accomplishes the foregoing objects by employing a plurality of tape magazines which carry tape recordings. The magazines are mounted in stacked relationship adjacent tape driving means and transducing means. Means are provided for releasably holding the magazines and urging them in a direction to engage the tape driving and transducing means whereby the recordings on the tape may be reproduced or the tape may be recorded. A programmed cam assembly is provided for restraining movement of the magazines towards the driving and transducing means. Said programmed cam assembly allows the magazine to move individually into operative relationship with the driving and transducing means in a programmed sequence.

The foregoing and other objects of the invention may be more clearly understood from the following description when taken in conjunction with the accompanying drawing.

Referring to the drawing.

The apparatus illustrated includes a housing 11. The lower portion of the housing 11 houses the electronic components of the apparatus such as preamplifiers, amplifiers and control circuits. A control panel 12 accommodates the control switches and knobs.

Figure 1:
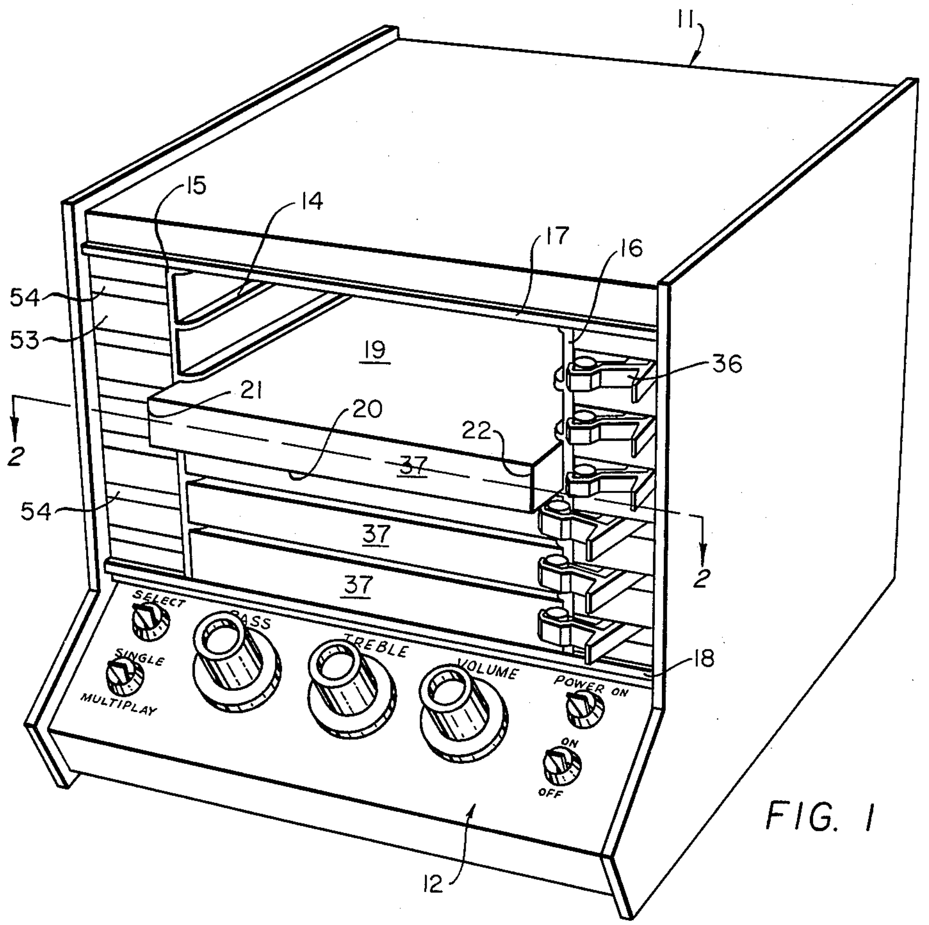
FIGURE 1 is a perspective view of apparatus in accordance with the invention.
Figure 3:
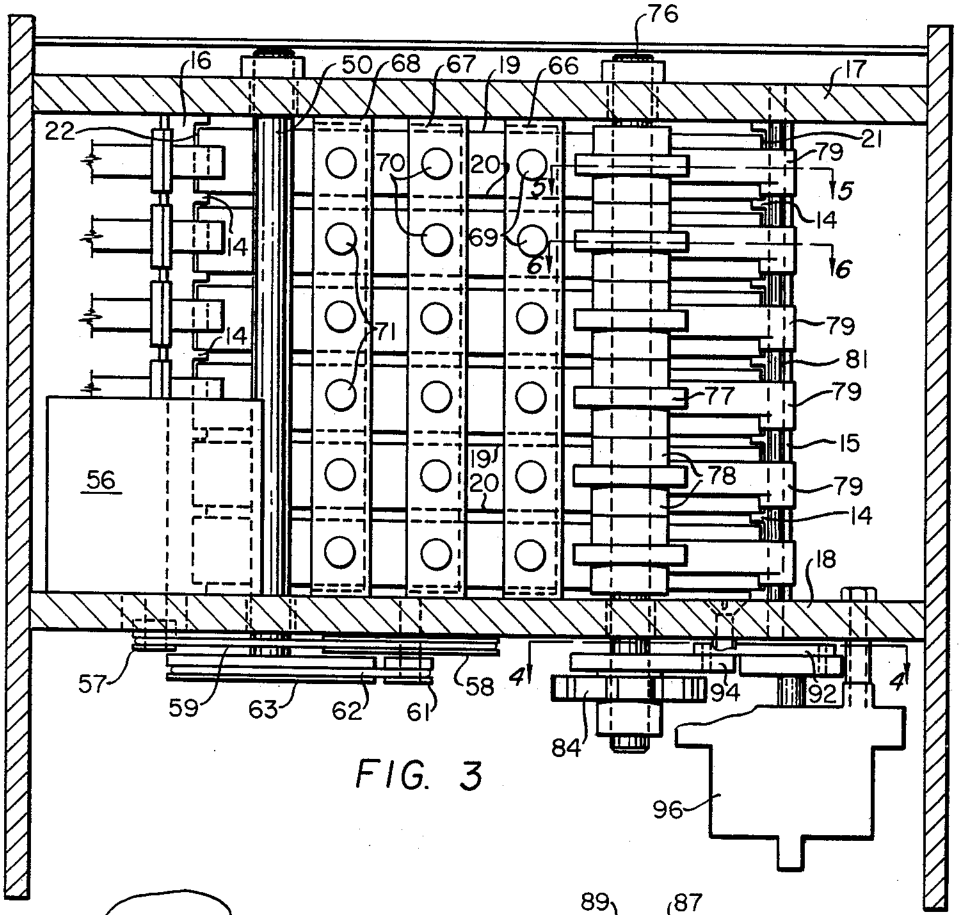
FIGURE 3 is a view taken along the line 3—3 of FIGURE 2.

The upper part of the housing is adapted to receive tape magazines. Each of the magazines is guided by suitable guide means, for example, spaced guides 14 formed as ribs or spaced plates 15 and 16 which are mounted between spaced mounting plates 17 and 18 (FIGURES 1 and 3). Adjacent ribs or guides 14 engage the top and bottom 19 and 20 of the magazine at the side edges 21 and 22. The edges 21 and 22 of the magazine slide against the plates 15 and 16, respectively. The guide means orients the magazines for sliding movement into and out of the apparatus. The guides are so spaced and arranged that camming or other undesirable motion of the magazine is minimized.

The magazine may include a base plate 23 which includes a shaft 24 which rotatably receives a reel having a reel plate 26 and an upstanding hub 27. Endless magnetic tape is wound about the hub. The endless tape passes over a pinch roller 28, spaced guide rollers 29 and 31, and another guide roller 32. The tape, in general, is unwound from the center of the reel in conventional manner and is wound onto the outside of the reel. The magazines are releasably retained on the guides and urged toward the transducing means and tape drive means by latching means 36.

The latching means 36 has first and second operating positions. In the first operating position (upper latches, FIGURE 1), the latch is retained in its open position to allow insertion and removal of a magazine. When the latch is moved into this position, means are provided for ejecting or moving the magazine a short distance so that it can be easily grasped. In its second position (lower latches, FIGURE 1), the latch is disposed so as to engage the outer edge 37 of the magazine and to yieldably urge the same towards the rear of the apparatus into engagement with the tape drive means and transducing means, to be presently described.

Figure 2:
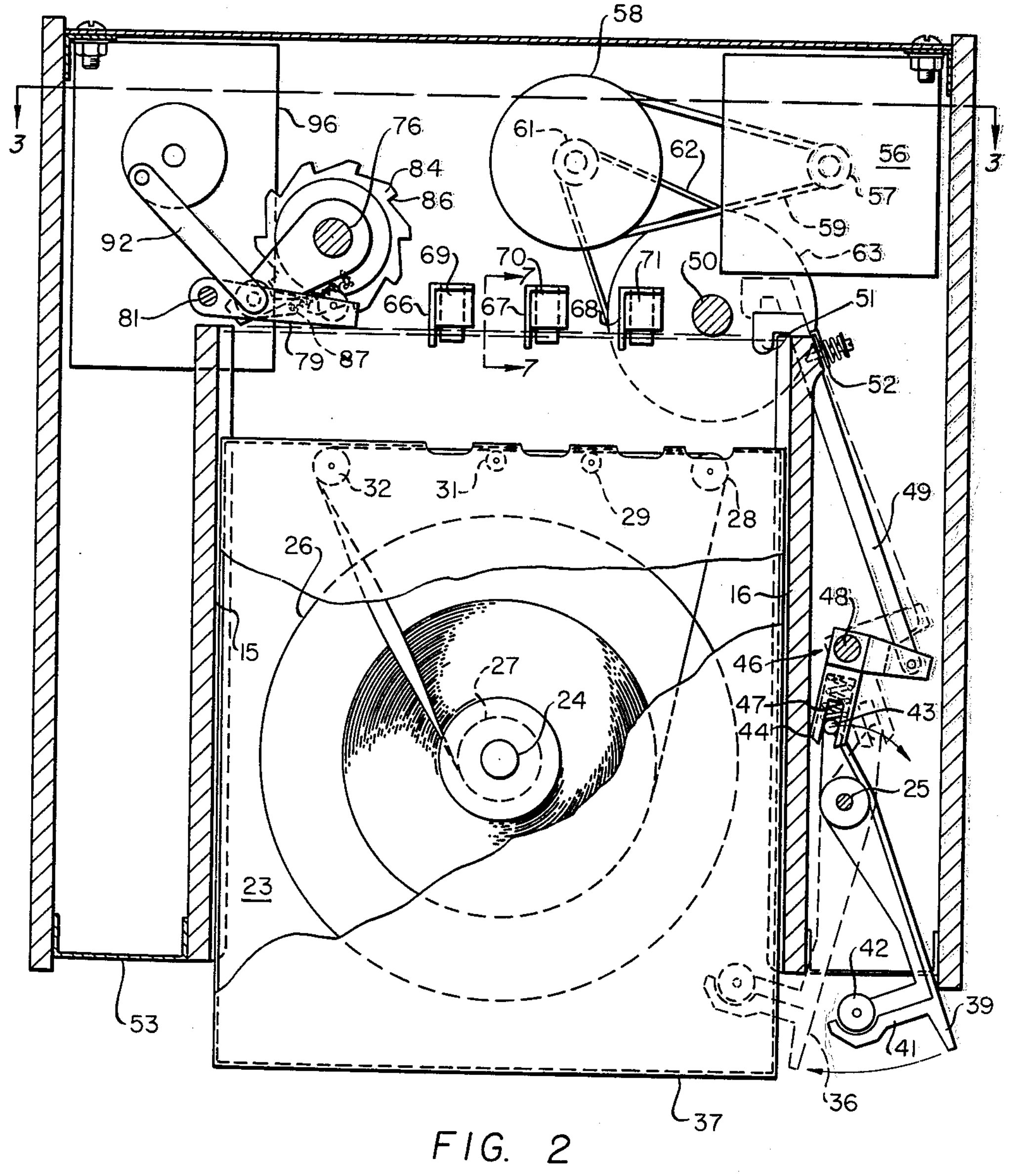
FIGURE 2 is a view taken along the line 2—2 of FIGURE 1.

The plurality of latches 36 are pivoted on a shaft 25, FIGURE 2. One end of the lever includes a tab or ear 39 which may be grasped or pushed with a finger for moving the latch between the first and second operating positions. Extending at substantially right angles to the body of the lever 36 is a finger 41 which carries a roller 42. The roller 42 in the second operating position of the latch (shown in dotted line) engages the end 37 of the magazine to urge the same into the apparatus.

The other end of the lever 36 is provided with ears 43 which ride in the spaced fingers 44 of the crank arm 46. A toggle spring 47 is retained between the four spaced fingers. As shown, the lever is toggled in a counterclockwise direction. Its motion is stopped by one of the fingers 44 abutting the adjacent plate 16. When the lever is in the position shown in dotted outline, the lever is toggled in a clockwise direction. The spring provides a force which resiliently urges the magazine toward the driving and transducing means.

The crank 46 is pivoted at 48, and the other end of the crank arm engages a rod-like member 49. Movement of the lever 36 results in substantially linear movement of the rod 49 as indicated by the two positions shown in dotted and solid line. It is observed that in the position shown in solid line (the first position of the latch 36), the lever is drawn so that the finger-like portion 51 strikes the magazine to drive the same out of the apparatus so that it can be easily grasped. In the second position of the latch 36, the member is drawn out of engagement. A spring-loaded guide 52 is provided for assuring that the end of the rod 49 moves in a substantially linear direction.

The latch assembly is carried in the space between the guide plate 16 and the side walls of the housing as illustrated in FIGURES 1 and 2. On the other side of the housing, the end of the space may be closed by U-shaped members 53 (FIGURE 2) which may be spaced 54 to receive tags or other material identifying the content of the adjacent tape magazine.

Summarizing, in the first position of the latching means, the magazine is ejected and the latch toggled to its release position; in the second position, the latching means holds the magazine and resiliently, or yieldably, urges the magazine into engagement with the tape drive means and transducing means.

A capstan 50 is rotatably mounted between the plates 17 and 18, FIGURES 2 and 3. The capstan 50 is adapted to cooperate with the pinch roller 28 of the individual magazines when the magazines are urged into their operating position.

The capstan may be suitably driven as, for example, by a motor 56 through belts and pulleys. Motor pulley 57 drives a first idler pulley 58 through a belt 59. A second idler pulley 61 carries belt 62 which drives the pulley 63 attached to the lower end of the capstan. To accommodate various tape speeds, the pulleys may be changed so that they have different ratios of diameters. Alternatively, the motor may be selected to provide a different speed.

One or more head mounting brackets are carried at the rear of the apparatus by the plates 17 and 18. In the illustrative example, three brackets 66, 67 and 68 are shown. Each of the brackets 66, 67 and 68 carries a plurality of magnetic heads 69, 70 and 71, respectively. The three magnetic heads may be recording, erase and playback heads 69, 70 and 71, respectively. If it is desired only to playback pre-recorded programs, then only one bracket is required with its associated heads one for each magazine. The bracket includes spaced fingers 72 forming a notch. The bottom 73 of the notch is adapted to abut the tape when the magazine is in the operative position. The sides 74 of the fingers 72 guide the tape.

The programming cam assembly includes a cam shaft 76 rotatably mounted between the spaced plates 17 and 18. The cam shaft is adapted to carry a plurality of cams. Each of the cams includes a cam surface 77 with hubs 78 on each side thereof. A plurality of cam follower levers 79, one for each cam, are rotatably carried on a shaft 81 which is disposed between the plates 17 and 18.

Figure 5:
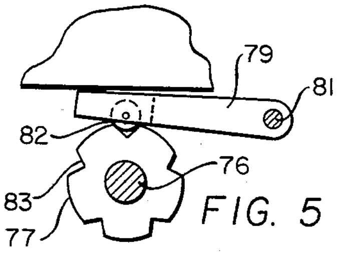
FIGURE 5 shows first programming cams viewed from the line 5—5 of FIGURE 3.
Figure 6:
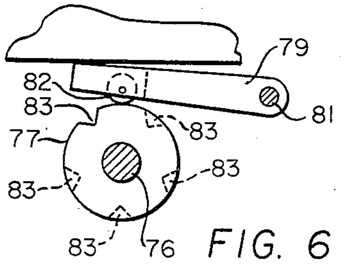
FIGURE 6 shows second programming cams as viewed from the line 6—6 of FIGURE 3.
Figure 4:
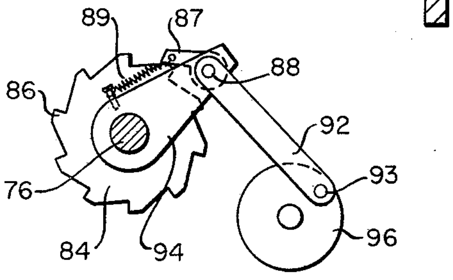
FIGURE 4 is an enlarged view showing the cam advancing mechanism.
Figure 7:
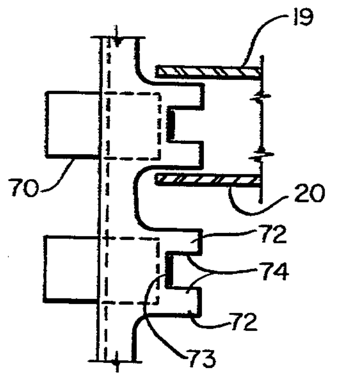
FIGURE 7 is a view taken along the line 7—7 of FIGURE 2.

The cam follower 79 carries a cam follower roller 82, FIGURES 5 and 6, which is adapted to ride on the cams. As is seen in FIGURES 5 and 6, each of the cams is provided with one or more notches. As the cams are rotated and the notch 83 falls adjacent one of the rollers, the lever 79 is allowed to rotate counter-clockwise as viewed in FIGURES 5 and 6. The magazine or cartridge may now move to the rear under urging of the toggle spring (FIGURE 2), in which position the capstan engages the tape between it and the pinch roller and serves to drive the same past the magnetic heads which are also in cooperative relationship with the tape carried in the magazine. The cam arrangement may be designed so as to eliminate the cam follower. The foregoing example is only illustrative of one manner of controlling the camming of the magazines.

As illustrated in FIGURE 5, the upper cam is provided with a plurality of notches, whereas the next cam is provided with a single notch as are each of the other cams. It is also observed that the notches in FIGURE 5 are angularly staggered with respect to the notches of FIGURE 6.

Assume the first selection on the first magazine is played. Rotation of the cam shaft 76 brings the notch 83 of one of the other cams adjacent its cam follower roller and allows that magazine to move to the rear with the tape engaging the capstan and transducer. The first magazine is urged forward out of engagement with the drive and transducer. Upon further rotation of shaft 76, magazine one will be moved to engage the drive and transducer. The magazine just completed will be cammed out of engagement. The notches may be arranged in any desired order to transduce the tape in the various magazines in the order desired. As illustrated in the drawings, the program will alternate between the first magazine and each of the second magazines in sequence. The sequence can be predetermined by appropriately notching the cams.

The cam shaft 76 is advanced by means of a ratchet wheel 84. The teeth 86 in the ratchet wheel are successively engaged by a pawl 87. The pawl 87 is pivoted on the shaft 88 and spring loaded with a spring 89. A rotary solenoid 96 rotates to advance and retract the link 92 to cause the pawl to engage each of the teeth successively to advance the ratchet wheel through one step for each energization of the solenoid. The link 92 is pivoted to the rotary solenoid at 93 and carried by arm 94 pivotally carried on the cam shaft 76. The number of teeth on the ratchet 84 is selected to correspond to the cam detent positions of the various cams so that at each step one of the notches 83 coincides with one of the cam follower rollers 82. Alternatively, the cam shaft 76 can be driven by a stepping motor (not shown).

Figure 8:
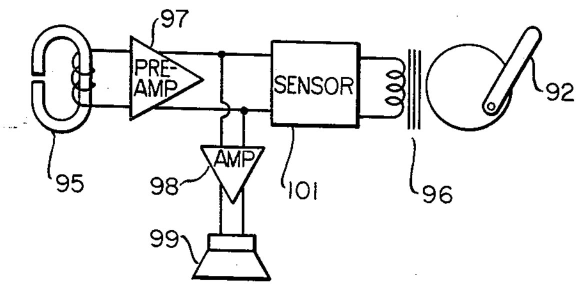
FIGURE 8 shows in schematic block diagram form a circuit used in conjunction with the transducer for advancing the cams at the end of a recording.

A silent sensing circuit may be employed to energize the solenoid or motor at the end of each selection, be it a song, musical composition, teaching material or an instruction. A suitable electrical circuit is illustrated in FIGURE 8. A reproduce transducer 95 feeds a preamplifier 97. The output of preamplifier 97 is applied to a power amplifier 98 which drives a speaker 99.

The output of the preamplifier 97 may also be applied to a sensor 101 which serves to provide output signals for energizing the solenoid 96 to program the apparatus to the next selection. The sensor 101 may, for example, be a silent sensor which serves to provide an output pulse whenever a recording provides no output for a predetermined short period of time.

Assume, for example, that a plurality of instructions or information is recorded on the tape of the first magazine. If, during the recording of the instructions, a suitable silent interval is provided between each instruction, the silent sensor 101 will provide an output pulse which serves to energize the solenoid to rotate the cam shaft and program to the next magazine whenever the silent interval occurs during reproduction.

Upon the end of the selection in the new magazine, the appropriate silent period will occur and the cam shaft will be advanced another notch to bring the next notch adjacent the appropriate cam follower for programming to the next magazine.

Figure 9:
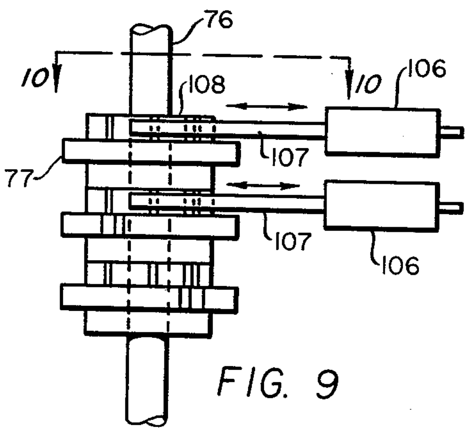
FIGURE 9 shows another embodiment of the programmed cam assembly.
Figure 10:
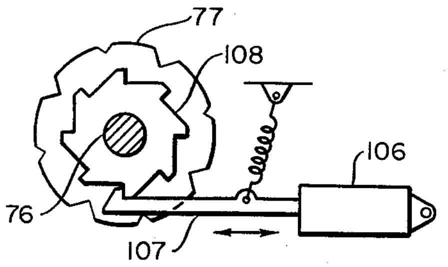
FIGURE 10 is a view taken from the line 10—10 of FIGURE 9.

In certain instances, it may be desirable to provide means for selecting magazines outside of the program or for individually programming. For this purpose, the programmed cams 77 can be arranged to be rotatable on the cam shaft 76, FIGURE 9. Individual solenoid means 106 can carry a pawl 107. The programmed cams 77 can be rotated by a ratchet wheel 108. One solenoid and ratchet wheel can be associated with each magazine position. As a result, an electrical switching circuit can be employed to program the device. The cams 77 may include a plurality of notches 83 with the ratchet wheel provided with twice the number of teeth. As a result, with a first energization of the solenoid, the notch is opposite the associated cam wheel and during the next energization, the magazine is cammed out. There may be provided detent notches 85, if desired. As a result, the apparatus can be easily programmed by selectively energizing the solenoids.

Figure 11:
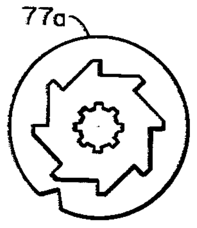
FIGURE 11 is a view showing mounting of a cam so that it is adaptable to the assembly of FIGURES 3 and 9.
Figure 12:
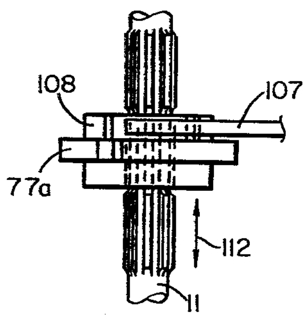
FIGURE 12 is a side elevational view of the mounting of FIGURE 11.

An alternative is to mount the cam wheel and ratchet on a splined shaft 111 (FIGURE 12) which is axially movable 112. The spline is arranged to extend only over a part of the shaft. In one axial position of the shaft, the cam wheels **77*a*** (FIGURE 11) are fixed thereto and rotate with the shaft. In the other position, the cams can be individually controlled by solenoids connected to a programming electrical circuit.

Figure 13:
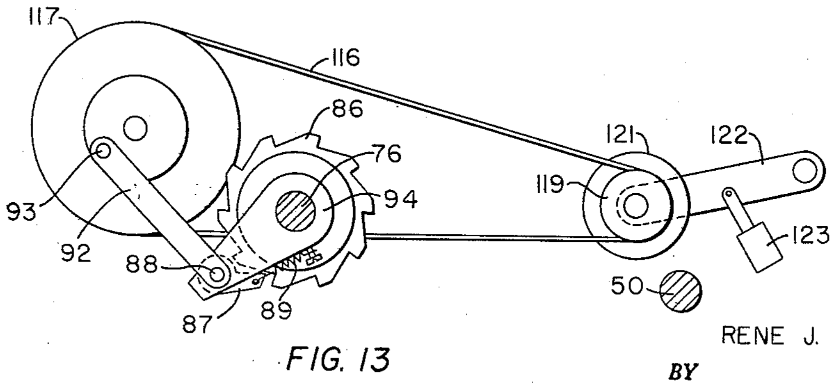
FIGURE 13 is a partial view showing another programmed cam driving means.

Rather than using the separate solenoid 96 to advance the cam shaft, the power may be obtained by selectively driving from the capstan. Referring to FIGURE 13, such a drive linkage is shown. The parts shown in FIGURE 13 which correspond to parts previously described bear the same reference numbers and operate in the same manner as previously described. The link 92 is driven by a belt 116 operating on a pulley 117. The belt is driven by a pulley 119 carried by the idler wheel 121. The periphery of the idler wheel is adapted to engage capstan 50. The idler is rotatably carried by the arm 122 pivotally retained by the housing. A solenoid 123 is arranged to move the arm 122 to bring the idler 121 momentarily into contact with the capstan to drive the idler which through the belt drive means and linkage advances the cam shaft 76.

Thus, it is seen that the apparatus operates by releasing the magazines in a programmed manner to allow the same to be urged into engagement with the tape drive means and transducting means. The magazines are cammed out of playing position at the end of a recording. There may be as many selections on each of the tapes as desired. One or more of the selections will be played depending upon where the silent period is placed. When the silent peried is sensed, the cam shaft 76 is rotated to program to the next selection of the next magazine. The apparatus is simple in construction and easy to operate.

I claim:

1. A tape apparatus comprising a plurality of tape magazines each including a tape, means for holding said magazines one next to the other, at least one transducer adapted to transduce the tape in a selected magazine, a drive means adjacent said selected magazines, means for yieldably urging said magazine towards the drive means to bring the tape into cooperative relationship with the transducer and drive means, means for holding the said magazine out of engagement with the associated transducer and drive means, said last named means including means for selectively releasing the same whereby the magazine is moved by the yieldable urging means to bring the tape into cooperative relationship with the associated transducer and drive means to transduce the tape.

2. Tape apparatus as in claim 1 wherein said means for holding said magazines out of engagement with the associated transducer and drive means comprises a cam.

3. A tape apparatus comprising a plurality of tape magazines each including a tape, a housing adapted to hold the magazines one next to the other, means for releasably holding the magazines in the housing, said means also serving to yieldably urge the magazines in the housing, at least one transducer adapted to transduce the tape at a selected magazine, a drive means adjacent said selected magazine, said releasable holding means serving to yieldably urge the magazines toward the drive means and transducer to bring the tape into cooperative relationship therewith, means for holding said magazines out of engagement with the associated transducer and drive means, said last named means including means for selectively releasing said magazines whereby the selected magazine is yieldably urged towards the drive means to bring the tape into cooperative relationship with the transducer and drive means to transduce the tape.

4. Apparatus as in claim 3 wherein said holding means comprises a latch assembly associated with each magazine, said latch assembly including a latch which is adapted to be positioned in a first position in which a magazine may be inserted and removed from the apparatus and a second position in which it holds the associated magazine and yieldably urges the same towards the drive means and transducer.

5. A tape apparatus comprising a plurality of tape magazines each including a tape, means for holding the magazines one next to the other, at least one transducer adapted to transduce the tape in a selected magazine, a drive means having operable portions adjacent each of said magazines, means for yieldably urging said magazines towards the drive means to bring the tape into cooperative relationship with the transducer and drive means, and means for holding said magazines out of engagement with the associated transducer and drive means, said last named means including means for selectively releasing said magazines whereby a selected magazine may be urged into yieldable engagement with the drive means to move the tape past the transducer.

6. Apparatus as in claim 5 wherein a transducer is fixedly mounted adjacent each of the magazines.

7. A tape apparatus comprising a plurality of tape magazines each including a tape, a housing adapted to receive said magazines and to hold the same one next to the other, a latching means associated with each of said magazines for holding said magazines in said housing, said latch means having a first stable position in which the magazines may be freely inserted and removed from the housing, and a second latching position in which the magazines are engaged and yieldably urged into the housing, at least one transducer adapted to transduce the tape of a selected magazine, drive means having operable portions adjacent each of said magazines, and means for holding said magazines out of engagement with the drive means associated with each of the magazines, said last named means including means for selectively releasing said magazines whereby they are selectively moved towards the drive means by the yieldable means to engage the drive means and transducer to transduce the tape.

8. Apparatus as in claim 7 wherein in said first stable position said latching means includes means for urging the magazines part-way out of the housing so they can be easily grasped.

9. A tape apparatus comprising a plurality of tape magazines each including a tape, means for holding the magazines one next to the other, a plurality of transducers adapted to transduce the tape disposed adjacent each of said magazines and adapted to transduce the tape therein, drive means having operable portions adjacent each of said magazines, means for continuously yieldably urging said magazines towards the drive means to bring the tape into cooperative relationship with the associated transducer and drive means, and cam means having cam portions serving to hold each of said magazine out of engagement with an associated transducer and drive means against the urging of said yieldable urging means, said last named means including means for selectively moving said cams whereby selected magazines are freed to be yieldably urged towards the drive means and transducer to transduce the tape thereon.

10. Apparatus as in claim 9 wherein said cam means comprises a plurality of cams mounted on a common shaft and programmed to cyclically release the magazines upon rotation of said drive shaft.

11. Apparatus as in claim 9 which includes a plurality of cams adapted to be individually operated to selectively release the magazines.

12. Apparatus as in claim 10 wherein said shaft is selectively rotated by an electromagnetic means to rotate the shaft carrying the cams, a silent sensing means serving to develop a signal after a predetermined lapse of signal from a recording, and means for receiving said signal and energizing the electromagnetic means to rotate the shaft and thereby program to the next recording.

13. Apparatus as in claim 10 wherein each of said cams comprises a disc-like member having an indented portion and a cam follower adapted to ride thereon to control movement of the magazines.

14. Apparatus as in claim 10 wherein said shaft is selectively rotated by a drive assembly which is selectively driven by the tape drive means.

15. Apparatus as in claim 14 wherein said drive assembly includes a friction drive wheel, electromagnetic means for moving said drive wheel, a silent sensing means to move the friction drive wheel and thereby program to the next recording.

16. A tape apparatus comprising a plurality of tape magazines each including a tape, means for holding said magazines one next to the other, a transducer disposed adjacent each of said magazines for transducing the tape on the same, a drive means having driving portions adjacent each of said magazines, means for yieldably urging the magazines toward the drive means to bring the tape into cooperative relationship with an associated transducer and driving portion of the drive means, means for holding each of the magazines out of engagement with the associated transducer and driving portion of the drive means, said last named means including means for selectively releasing the magazines whereby the magazines are moved by the yieldable urging means to bring the tape into cooperative relationship with the associated transducer and drive means to transduce the magazine tape in selected magazines.

17. A tape apparatus of the type adapted to operate with tape cartridges comprising a housing, means in said housing for receiving and guiding a plurality of tape cartridges for sliding movement into said housing towards the rear of the same, said cartridges being held in side by side relationship in the housing, means at each cartridge position for releasably holding a cartridge placed in the housing, transducing means disposed at the rear of the housing, drive means for driving the tape disposed at the rear of the housing, said cartridges being normally held out of engagement with said transducing and driving means, and cam means having operable portions at each of said cartridge positions for selectively controlling movement of the cartridges from the normal position into the tape driving and transducing position whereby the tape driving means drives the tape past the transducing means to transduce the tape of a selected cartridge.

18. A tape apparatus as in claim 17 wherein said transducing means includes a transducer disposed in each of said cartridge positions and said drive means has operable portions at each of said cartridge positions.

19. A tape apparatus as in claim 17 wherein said cam means includes a plurality of cams spaced along a drive shaft and disposed at each of said cartridge positions.

20. Tape apparatus as in claim 1 further including silent sensing means serving to operate the selective releasing means after a predetermined lapse of signal from the tape being transcribed.

References Cited in the file of this patent

UNITED STATES PATENTS 2,821,576 Gaubert ---------------- Jan. 28, 1958

FOREIGN PATENTS 1,154,513 France ---------------- Nov. 4, 1957